(12) United States Patent
Herring et al.

(10) Patent No.: US 10,975,228 B2
(45) Date of Patent: Apr. 13, 2021

(54) COMPOSITIONS FOR INJECTION MOULDING

(71) Applicant: ImerTech SAS

(72) Inventors: George Birks Herring, Hartlepool (GB); Daniel Gene Moldovan, Chattanooga, TN (US); Fatima Rebih, Cornwall (GB)

(73) Assignee: IMERTECH SAS, Paris (FR)

( * ) Notice: Subject to any disclaimer, the term of this patent is extended or adjusted under 35 U.S.C. 154(b) by 0 days.

(21) Appl. No.: 15/736,996

(22) PCT Filed: Jun. 14, 2016

(86) PCT No.: PCT/US2016/037364
§ 371 (c)(1),
(2) Date: Dec. 15, 2017

(87) PCT Pub. No.: WO2016/205192
PCT Pub. Date: Dec. 22, 2016

(65) Prior Publication Data
US 2018/0186971 A1    Jul. 5, 2018

Related U.S. Application Data

(60) Provisional application No. 62/175,739, filed on Jun. 15, 2015.

(51) Int. Cl.
| | |
|---|---|
| *C08K 9/04* | (2006.01) |
| *B29B 7/90* | (2006.01) |
| *C08J 11/04* | (2006.01) |
| *C08J 11/16* | (2006.01) |
| *B29B 9/06* | (2006.01) |
| *B29B 7/00* | (2006.01) |
| *B29C 45/00* | (2006.01) |
| *C08K 3/04* | (2006.01) |
| *C08K 3/26* | (2006.01) |
| *C08L 23/06* | (2006.01) |
| *C08L 23/12* | (2006.01) |
| *B29K 509/00* | (2006.01) |
| *C08K 3/013* | (2018.01) |
| *C08K 5/14* | (2006.01) |
| *B29K 105/00* | (2006.01) |
| *B29K 23/00* | (2006.01) |
| *B29K 105/26* | (2006.01) |
| *B29K 509/02* | (2006.01) |

(52) U.S. Cl.
CPC ............. *C08K 9/04* (2013.01); *B29B 7/002* (2013.01); *B29B 7/90* (2013.01); *B29B 9/065* (2013.01); *B29C 45/0001* (2013.01); *B29C 45/0013* (2013.01); *C08J 11/04* (2013.01); *C08J 11/16* (2013.01); *C08K 3/04* (2013.01); *C08K 3/26* (2013.01); *C08L 23/06* (2013.01); *C08L 23/12* (2013.01); *B29K 2023/065* (2013.01); *B29K 2023/12* (2013.01); *B29K 2105/0005* (2013.01); *B29K 2105/0094* (2013.01); *B29K 2105/26* (2013.01); *B29K 2509/00* (2013.01); *B29K 2509/02* (2013.01); *C08K 3/013* (2018.01); *C08K 5/14* (2013.01); *C08K 2003/265* (2013.01); *C08K 2201/003* (2013.01); *C08K 2201/005* (2013.01); *C08L 2205/025* (2013.01); *C08L 2205/06* (2013.01); *C08L 2207/062* (2013.01); *C08L 2207/20* (2013.01)

(58) Field of Classification Search
CPC ... C08K 9/04; C08K 3/04; C08K 3/26; C08K 9/08; C08K 2201/003; C08K 2201/005; C08K 3/013; C08J 11/04; C08J 11/16; C08L 23/06; C08L 23/12; B29B 7/90; B29K 2105/26; B29C 45/0013; B29C 45/0001
USPC .................................................. 428/220
See application file for complete search history.

(56) References Cited

U.S. PATENT DOCUMENTS

| | | |
|---|---|---|
| 4,067,826 A | 1/1978 | Emery |
| 5,030,662 A | 7/1991 | Banerjie |
| 5,298,540 A | 3/1994 | Paquet et al. |
| 5,424,013 A | 6/1995 | Lieberman |

(Continued)

FOREIGN PATENT DOCUMENTS

| | | |
|---|---|---|
| BE | 831870 A1 | 11/1975 |
| CN | 101048456 A | 10/2007 |

(Continued)

OTHER PUBLICATIONS

International Search Report and Written Opinion dated Sep. 2, 2016, in International Application No. PCT/US2016/037364 (10 pgs.).

(Continued)

*Primary Examiner* — Hannah J Pak
(74) *Attorney, Agent, or Firm* — Finnegan, Henderson, Farabow, Garrett & Dunner

(57) ABSTRACT

Use of a filled polymer resin in the manufacture of an article therefrom by injection moulding, a method of manufacturing an article by injection moulding a filled polymer resin, a method for enabling or improving the injection mouldability of a polymer resin comprising recycled polymer, wherein the polymer resin comprises recycled polymer and functional filler, the use of a functional filler in a polymer resin comprising recycled polymer to improve the injection mouldability of the polymer resin, an article of manufacture obtained by injection moulding a filled polymer resin, and a filled polymer resin.

23 Claims, No Drawings

(56) References Cited

U.S. PATENT DOCUMENTS

| | | | |
|---|---|---|---|
| 5,951,940 A | 9/1999 | Nosker et al. | |
| 6,139,945 A * | 10/2000 | Krejchi | B32B 5/18 |
| | | | 428/317.9 |
| 6,241,168 B1 | 6/2001 | Young et al. | |
| 6,403,692 B1 | 6/2002 | Traugott et al. | |
| 5,719,198 A1 | 2/2006 | Young et al. | |
| 7,781,110 B2 | 5/2010 | Hoogland | |
| 7,884,140 B2 | 2/2011 | Riise et al. | |
| 8,067,518 B2 | 11/2011 | Davey et al. | |
| 8,075,987 B2 | 12/2011 | Ricciardelli et al. | |
| 8,629,221 B2 | 1/2014 | Nosker et al. | |
| 2002/0135096 A1 | 9/2002 | Koike | |
| 2003/0139530 A1 | 7/2003 | Starita | |
| 2005/0038189 A1 | 2/2005 | Takimoto et al. | |
| 2005/0154129 A1 * | 7/2005 | Battiste | B01J 19/0006 |
| | | | 525/74 |
| 2006/0189761 A1 | 8/2006 | Jin et al. | |
| 2007/0049696 A1 | 3/2007 | Gonzalez et al. | |
| 2007/0161719 A1 | 7/2007 | Rauh | |
| 2007/0212531 A1 | 9/2007 | McIntyre et al. | |
| 2007/0255007 A1 | 11/2007 | Dean | |
| 2008/0014429 A1 | 1/2008 | Su et al. | |
| 2008/0206583 A1 | 8/2008 | Phan et al. | |
| 2010/0234513 A1 | 9/2010 | Milesi et al. | |
| 2011/0197788 A1 | 8/2011 | Bradshaw et al. | |
| 2012/0119414 A1 | 5/2012 | Van Helden | |
| 2012/0296039 A1 | 11/2012 | Cavalieri et al. | |
| 2017/0261131 A1 * | 9/2017 | Papillon | C08L 23/04 |
| 2018/0186971 A1 * | 7/2018 | Herring | B29C 45/0001 |
| 2018/0312672 A1 * | 11/2018 | Rebih | C08L 23/12 |
| 2019/0153204 A1 * | 5/2019 | Rebih | C08J 11/04 |

FOREIGN PATENT DOCUMENTS

| | | |
|---|---|---|
| CN | 101213248 A | 7/2008 |
| CN | 103748151 A | 4/2014 |
| DE | 156917 A1 | 9/1982 |
| EP | 963825 A1 | 12/1999 |
| EP | 1263526 A1 | 12/2002 |
| EP | 1500673 A1 | 1/2005 |
| EP | 2358810 A1 | 8/2011 |
| EP | 2610290 A1 | 3/2013 |
| JP | 2000/007792 A | 1/2000 |
| JP | 2003/253058 A | 9/2003 |
| JP | 2005/023190 A | 1/2005 |
| JP | 2006/015721 A | 1/2006 |
| JP | 2007/130831 A | 5/2007 |
| JP | 2007/291213 A | 8/2007 |
| JP | 2014/523462 | 12/2012 |
| MX | 192525 B | 7/1999 |
| PT | 64127 A | 6/1976 |
| WO | WO 1994/007946 A1 | 4/1994 |
| WO | WO 1994/007950 A1 | 4/1994 |
| WO | WO 1995/015819 A1 | 6/1995 |
| WO | WO 1996/009341 A1 | 3/1996 |
| WO | WO 1997/005179 A1 | 2/1997 |
| WO | WO 97/11114 | 3/1997 |
| WO | WO 1997/030112 A1 | 8/1997 |
| WO | WO 99/16797 | 4/1999 |
| WO | WO 2000/029184 A1 | 5/2000 |
| WO | WO 2004/039875 A1 | 5/2004 |
| WO | WO 2005123817 A1 | 12/2005 |
| WO | WO 2007/061887 A2 | 5/2007 |
| WO | WO 2007/070967 A1 | 6/2007 |
| WO | WO 2007/071494 A1 | 6/2007 |
| WO | WO 2012/162227 A1 | 11/2012 |
| WO | WO 2012/175504 | 12/2012 |
| WO | WO 2014/147106 A2 | 9/2014 |
| WO | WO 2016/038110 A2 | 3/2016 |

OTHER PUBLICATIONS

Equistar (A Lyondell Company) "Using Spiral Flow to Achieve Optimum Processability and Properties," Injecting Molding Technical Tip (2 pages).

* cited by examiner

COMPOSITIONS FOR INJECTION MOULDING

CLAIM FOR PRIORITY

This application is a U.S. national phase entry under 35 U.S.C. § 371 from PCT International Application No. PCT/US2016/037364, filed Jun. 14, 2016, which claims the benefit of priority of U.S. Provisional Application No. 62/175,739, filed Jun. 15, 2015, to both of which this application claims priority and both of which are incorporated herein by reference.

TECHNICAL FIELD

The present invention is directed to the use of a filled polymer resin in the manufacture of an article therefrom by injection moulding, to a method of manufacturing an article by injection moulding a filled polymer resin, to a method for enabling or improving the injection mouldability of a polymer resin comprising recycled polymer, wherein the polymer resin comprises recycled polymer and functional filler, to the use of a functional filler in a polymer resin comprising recycled polymer to improve the injection mouldability of the polymer resin, to an article of manufacture obtained by injection moulding a filled polymer resin, and to a filled polymer resin.

BACKGROUND OF THE INVENTION

There is an ever increasing demand to recycle and re-use polymer materials since this provides cost and environmental benefits. However, the reprocessing of recycled polymer waste presents challenges which are not necessarily encountered during processing of polymer compositions derived from virgin polymer. For example, recycled polymers may be unsuitable for injecting moulding.

As the need to recycle polymer waste materials increases, there is a continuing need for the development of new compositions for the economically viable processing of polymer waste materials into high quality articles of manufacture.

SUMMARY OF THE INVENTION

According to a first aspect, the present invention is directed to the use of a filled polymer resin in the manufacture of an article therefrom by injection moulding, wherein the polymer resin comprises recycled polymer and functional filler, wherein the function filler comprises an inorganic particulate which (i) is surface treated and/or (ii) has a $d_{50}$ of less than about 2.5 μm, and wherein the filled polymer resin has:
(1) a MFI @ 2.16 kg/190° C. which is lower than the MFI of the filled polymer resin during injection moulding; and/or
(2) a MFI @ 2.16 kg/190° C. which is at least 3 g/10 mins lower than the apparent MFI of the filled polymer resin during injection moulding; and/or
(3) a MFI @ 2.16 kg/190° C. of less than about 2.5 g/10 min, for example, less than about 2.0 g/10 min, and optionally:
  (a) a Spiral Flow Number (SFN) which is comparable to an unfilled virgin HDPE resin having a MFI @ 2.16 kg/190° C. of at least about 5.0 g/10 min, and/or
  (b) a SFN which is at least 80% of the SFN of an unfilled virgin HDPE polymer resin having a MFI of 8.0 g/10 mins @ 2.16 kg/190° C.

According to a second aspect, the present invention is directed to a method of manufacturing an article by injection moulding, the method comprising injection moulding an article from a filled polymer resin, wherein the filled polymer resin comprises recycled polymer and functional filler, wherein the function filler comprises an inorganic particulate which (i) is surface treated and/or (ii) has a $d_{50}$ of less than about 2.5 μm, and wherein the filled polymer resin has:
(1) a MFI @ 2.16 kg/190° C. which is lower than the MFI of the filled polymer resin during injection moulding; and/or
(2) a MFI @ 2.16 kg/190° C. which is at least 3 g/10 mins lower than the apparent MFI of the filled polymer resin during injection moulding; and/or
(3) a MFI @ 2.16 kg/190° C. of less than about 2.5 g/10 min, for example, less than about 2.0 g/10 min, and optionally:
  (a) a Spiral Flow Number (SFN) which is comparable to an unfilled virgin HDPE resin having a MFI @ 2.16 kg/190° C. of at least about 5.0 g/10 min, and/or
  (b) a SFN which is at least 80% of the SFN of an unfilled virgin HDPE polymer resin having a MFI of 8 g/10 mins @ 2.16 kg/190° C.

According to a third aspect, the present invention is directed to the use of a functional filler in a polymer resin comprising recycled polymer MFI to improve the injection mouldability of the polymer resin, wherein the function filler comprises an inorganic particulate which (i) is surface treated and/or (ii) has a $d_{50}$ of less than about 2.5 μm.

According to a fourth aspect, the present invention is directed to a method for enabling or improving the injection mouldability of a polymer resin comprising recycled polymer, the method comprising filling the polymer resin with a functional filler, forming a filled polymer resin, and manufacturing an article of manufacture from the filled polymer resin by injection moulding, wherein the function filler comprises an inorganic particulate which (i) is surface treated and/or (ii) has a $d_{50}$ of less than about 2.5 μm, and wherein the filled polymer resin has:
(1) a MFI @ 2.16 kg/190° C. which is lower than the MFI of the filled polymer resin during injection moulding; and/or
(2) a MFI @ 2.16 kg/190° C. which is at least 3 g/10 mins lower than the apparent MFI of the filled polymer resin during injection moulding; and/or
(3) a MFI @ 2.16 kg/190° C. of less than about 2.5 g/10 min, for example, less than about 2.0 g/10 mins, and
  (a) a Spiral Flow Number (SFN) which is comparable to an unfilled virgin HDPE resin having a MFI @ 2.16 kg/190° C. of at least about 5.0 g/10 mins, and/or
  (b) a SFN which is at least 80% of the SFN of an unfilled virgin HDPE polymer resin having a MFI of 8 g/10 mins @ 2.16 kg/190° C.

According to a fifth aspect, the present invention is directed to an article of manufacture obtained by injection moulding a filled polymer resin as defined in any of the first, second, third or fourth aspects.

According to a sixth aspect, the present invention is directed to a filled polymer resin suitable for use in the manufacture of an article therefrom by injection moulding, wherein the polymer resin comprises recycled polymer and functional filler, wherein the function filler comprises an inorganic particulate which (i) is surface treated and/or (ii) has a $d_{50}$ of less than about 2.5 µm, and wherein the filled polymer resin has:
(1) a MFI @ 2.16 kg/190° C. which is lower than the MFI of the filled polymer resin during injection moulding; and/or
(2) a MFI @ 2.16 kg/190° C. which is at least 3 g/10 mins lower than the MFI of the filled polymer resin during injection moulding; and/or
(3) a MFI @ 2.16 kg/190° C. of less than about 2.5 g/10 min, for example, less than about 2.0 g/10 min, and optionally:
   (a) a Spiral Flow Number (SFN) which is comparable to an unfilled virgin HDPE resin having a MFI @ 2.16 kg/190° C. of at least about 5.0 g/10 min, and/or
   (b) a SFN which is at least 80% of the SFN of an unfilled virgin HDPE polymer resin having a MFI of 8 g/10 mins @ 2.16 kg/190° C.

DETAILED DESCRIPTION OF THE INVENTION

Conventional wisdom is that a polymer resin must have a certain minimum Melt Flow Index (MFI) for it to be suitable for injection moulding. Surprisingly, however, it has been found that a polymer resin comprising recycled polymer and having a relatively low MFI (i.e., relative to the MFI of conventional virgin polymer resin used in injection moulding) can be injected moulded providing functionally and aesthetically acceptable articles of manufacture by filling the polymer resin with a functional filler. The filled polymer resin derived from recycled polymer may perform better even than virgin polymer resin. Without wishing to be bound by theory, it is believed that the polymer resin having a relatively low MFI under testing behaves differently than expected during injection moulding—it injection moulds as it if had a much higher MFI than the MFI measured under testing. It is currently believed that shear thinning effects take place. This surprising finding enables greater utility of recycled polymers previously thought unsuitable for injection moulding, and may provide cost and environmental benefits as injection moulded articles, particularly thin-walled articles of manufacture, can be manufactured from a greater variety of recycled polymers (including mixed polymer), which is normally cheaper than virgin resin, and means reliance on virgin polymers may be reduced and utility of recycled polymers increased, which is environmentally desirable. Further, the inclusion of filler provides additional cost and environmental benefits as less polymer is used. The filler is functionalised through incorporation of a surface treatment and/or by controlling particle size.

As such, by "functional filler" is a meant a filler material which enhances the processability by injection moulding of a polymer resin comprising recycled polymer. The functional filler comprises inorganic particulate which (1) is surface treated and/or (ii) has a $d_{50}$ of no greater than about 2.5 µm. In certain embodiments, functional filler comprises inorganic particulate having a $d_{50}$ of no greater than about 2.5 µm which is surface treated. In certain embodiments, the enhancement in processability may be assessed by comparison with:
(i) the polymer resin absent the functional filler; and/or
(ii) the polymer resin filled with a filler which is not surface treated and/or has a $d_{50}$ greater than 2.5 µm; and/or
(iii) virgin polymer resin having an MFI of at least 2.0 g/10 mins @ 2.16 kg/190° C., or at least 2.5 g/10 mins @ 2.16 kg/190° C., or from 2.0 to about 30 g/10 mins @ 2.16 kg/190° C., or from 2.5 g/10 mins to about 30 g/10 mins @ 2.16 kg/190° C.; and/or
(iv) a virgin polymer resin having an MFI of at least 2.0 g/10 mins @ 2.16 kg/190° C., or at least 2.5 g/10 mins @ 2.16 kg/190° C., or from 2.0 to about 30 g/10 mins @2.16 kg/190° C., or from 2.5 g/10 mins to about 30 g/10 mins @ 2.16 kg/190° C., and which is filled with the functional filler; and/or
(v) a virgin polymer resin having an MFI of at least 2.0 g/10 mins @ 2.16 kg/190° C., or at least 2.5 g/10 mins @ 2.16 kg/190° C., or from 2.0 g/10 mins to about 30 g/10 mins @ 2.16 kg/190° C., or from 2.5 g/10 mins to about 30 g/10 mins @ 2.16 kg/190° C., which is filled with a filler which is not surface treated and/or has a $d_{50}$ greater than 2.5 µm; and/or
(vi) a virgin polymer resin having a comparable MFI; and/or
(vii) a virgin polymer resin having a comparable MFI and which is filled with the functional filler; and/or
(viii) a virgin polymer resin having a comparable MFI and which is filled with a filler which is not surface treated and/or has a $d_{50}$ greater than 2.5 µm; and/or
(ix) an unfilled virgin HDPE polymer resin having a MFI of 8.0 g/10 mins @ 2.16 kg/190° C.

Processability metrics include:
(1) the Spiral Flow Number (SFN) of the filled polymer resin (SFN is discussed in greater detail below)
(2) the surface finish of the article formed by injection moulding; and/or
(3) the colour of the article formed by injection moulding; and/or
(4) cycle time; and/or
(5) peak injection pressure (average and/or range, at equivalent MFI); and/or
(6) mould filling (i.e., flowability into and in the mould); and/or
(7) weight range across 32 shots; and/or
(8) de-moulding capability.

The filler polymer resin may be used in the manufacture of an article therefrom by injection moulded, or in a method of manufacturing an article by injection moulding. In certain embodiments, the function filler is used to enable or improve the injection mouldability of a polymer resin comprising recycled polymer, or is used in a method for enabling or improving the injection mouldability of a polymer resin comprising recycled polymer. The use or method comprises filling the polymer resin with functional filler and manufacturing an article of manufacture therefrom by injection moulding.

In certain embodiments, the article of manufacture is processed from the filled polymer resin at a melt temperature of from about 190° C. to about 250° C., for example, from about 200° C. to about 240° C., or from about 205° C. to about 235° C., or from about 210° C. to about 230° C., or from about 215° C. to about 230° C., or from about 220° C. to about 230° C. Suitable barrel and feed throat temperature settings will be selected depending on the melt temperature.

In certain embodiments, the peak pressure average during injection moulding is from about 500 to 2000 bar, for example, from about 750 to 2000 bar, or from about 750 to about 1500 bar, or from about 750 to about 900 to about 1400 bar, or from about 900 to about 1300 bar, or from about 900 to about 1100 bar, of from about 1100 bar to about 1300 bar. Additionally or alternatively, the peak injection pressure range may be equal to or less than about 7.0 bar, for example, equal to or less than about 6.5 bar, or equal to or less than about 6.0 bar, or equal to or less than about 5.5 bar, or equal to or less than about 5.0 bar, or equal to or less than about 4.5 bar, or equal to or less than about 4.0 bar, or equal to or less than about 3.5 bar, or equal to or less than about 3.0 bar, or equal to or less than about 2.5 bar.

In certain embodiments, the cycle time (during injection moulding) to produce an article of manufacture is at least about 10% shorter than the cycle time to produce a like article of manufacture from an unfilled HDPE virgin polymer resin under the same processing conditions, for example, at least about 20% shorter, or at least about 30% shorter than the cycle time to produce a like article of manufacture from an unfilled HDPE virgin polymer resin under the same processing conditions. In certain embodiments, the cycle time is at least 10% shorter to no more than about 40% shorter, or at least about 15% shorter to no more than about 35% shorter than the cycle time to produce a like article of manufacture from an unfilled HDPE virgin polymer resin under the same processing conditions.

In certain embodiments, the cycle time to produce an article of manufacture is equal to or less than about 30 s, for example, equal to or less than about 25 s, or equal to or less than about 20 s, or equal to or less than about 15 s, or equal to or less than about 14 s, or equal to or less than about 13 s, or equal to or less than about 12 s, or equal to or less than about 11 s, or equal to or less than about 10 s. In such embodiments, the said cycle times may be at least about 10% shorter than the cycle time to produce a like article of manufacture from an unfilled HDPE virgin polymer resin under the same processing conditions, for example, at least about 20% shorter, or at least about 30% shorter than the cycle time to produce a like article of manufacture from an unfilled HDPE virgin polymer resin under the same processing conditions. In certain embodiments, the cycle time is at least 10% shorter to no more than about 40% shorter, or at least about 15% shorter to no more than about 35% shorter.

In certain embodiments, the weight range across 32 shots (during injection moulding) is less than 0.008 g for an average shot weight of between 3.25 g and 4.0 g, for example, equal to or less than 0.007 g, or equal to or less than 0.006 g, or equal to or less than about 0.005 g for an average shot weight of between 3.25 and 4.0 g.

In certain embodiments:
 the melt temperature is from about 190° C. to about 250° C., for example, from about 200° C. to about 240° C., or any other melt temperature or range of melt temperature described herein;
 the cycle time is (i) is at least about 10% shorter than the cycle time to produce a like article of manufacture from an unfilled HDPE virgin polymer resin under the same processing conditions, for example, at least about 20% shorter, or at least about 30% shorter, and/or (ii) equal to or less than about 30 s, for example, equal to or less than about 15 s, or any other cycle time or range of cycle time described herein;
 the peak pressure average during injection moulding is from about 500 to 2000 bar, for example, from about 750 to 2000 bar, or any other peak pressure average or range of peak pressure average described herein.

The filled polymer resin has a MFI @ 2.16 kg/190° C. which is relatively low and which, prior to this invention, would not have been expected to be suitable for injection moulding. MFR may be determined in accordance with ISO 1133, for example, ISO 1133-1:2011 (e.g., by the mass-measurement method).

In certain embodiments, the filled polymer resin has a MFI of less than about 2.5 g/10 mins @ 2.16 kg/190° C., for example less than about 2.0 g/10 min @ 2.16 kg/190° C. In certain embodiments, the filled polymer resin has a MFI which is equal to or less than about 2.4 g/10 min @ 2.16 kg/190° C., or equal to or less than about 2.25 g/10 min @ 2.16 kg/190° C., or equal to or less than about 2.0 g/10 min @ 2.16 kg/190° C., or equal to or less than about 1.75 g/10 mins @ 2.16 kg/190° C., or equal to or less than about 1.5 g/10 mins, or equal to or less than about 1.0 g/10 mins, or equal to or less than about 0.75 g/10 mins, or equal to or less than about 0.50 g/10 mins, or equal to or less than about 0.35 g/10 mins, or equal to or less than about 0.20 g/10 mins. In certain embodiments, the filled polymer resin has a MFI of at least about 0.05 g/10 mins @ 2.16 kg/190° C., for example, at least about 0.10 g/10 mins @ 2.16 kg/190° C., or at least about 0.15 g/10 mins @ 2.16 kg/190° C., or at least about 0.20 g/10 mins @2.16 kg/190° C.

In certain embodiments, the filled polymer resin has a MFI of from about 1.0 g/10 mins @ 2.16 kg/190° C. to less than 2.5 g/10 min @ 2.16 kg/190° C., for example, from about 1.25 g/10 mins @ 2.16 kg/190° C. to less than 2.5 g/10 mins @ 2.16 kg/190° C., or from about 1.5 g/10 mins @ 2.16 kg/190° C. to less than 2.5 g/10 mins @ 2.16 kg/190° C., or from about 1.75 g/10 mins @ 2.16 kg/190° C. to less than 2.5 g/10 mins @ 2.16 kg/190° C., or from about 2.0 g/10 mins @ 2.16 kg/190° C. to less than g/10 mins @2.16 kg/190° C.

In certain embodiments, the filled polymer resin has a MFI @ 2.16 kg/190° C. which is lower than the MFI of the filled polymer resin during injection moulding. In certain embodiments, the MFI during injection moulding is determined under the following conditions (using a Plaque Mould & Demag Ergotec Injection Moulding Machine, for example, a Demag Ergotech 150t System Servo Hydraulic Injection Moulding Machine):
 Melt temperature: 220° C.;
 Back pressure: 90 bar
 Decompression Distance: 8 mm at 30 mm/s
 Screw diameter: 25 mm
 Screw Surface Speed: 700 mm/s
 Injection Speed: 70 mm/s
 Dosing stroke: as required to achieve 100% visual fill with no Holding Stage
 Holding Pressure: as required to achieve a flat continuous surface finish
 Holding Time: 2.0 s
 Cooling Time: 6.0 s
 Clamp Force: 70t
 Mould temperature: 25° C.
 Hot Tip Temperature: 10° C. above Melt Temperature Exemplary injection moulding machines include Demag Ergotec Injection Moulding Machine, an E-motion Engel injection moulding machine, for example, an Engel 55t Servo Electric/injection moulding machine, or a Sumitomo SE180DU System 180t Servo Electric injection moulding machine.

In certain embodiments, the injection moulding process comprises:
 a mould temperature of from about 15° C. to about 40° C., for example, from about 20° C. to about 30° C., or from about 23° C. to about 27° C., or about 25° C.; and/or
 a back pressure of from about 50 bar to about 150 bar; and/or
 a screw diameter of from about 20 mm to about 40 mm; and/or
 a screw surface speed of from about 500 mm/s to about 1000 mm/s; and/or
 an injection speed of from about 50 mm/s to about 100 mm/sand/or;

a holding time of from about 1.0 s to about 5.0 s; and/or a cooling time of from about 30-70% of cycle time, for example, from about 2.0 s to about 20 s; and/or a clamp force of from about 50t to about 150t; and/or a hot temperature of +/−20° C. of melt temperature, for example, up to about 20° C. above melt temperature, or up to about 15° C. above melt temperature.

In certain embodiments, the filled polymer resin has a MFI @ 2.16 kg/190° C. which is at least 3.0 g/10 mins lower than the apparent MFI of the filled polymer resin during injection moulding, for example, at least about 3.5 g/10 mins lower, or at least about 4.0 g/10 mins lower, or at least about 4.5 g/10 mins lower, or at least about 5.0 g/10 mins lower, or at least about 5.5 g/10 mins lower, or at least about 6.0 g/10 mins lower than the apparent MFI of the filled polymer resin during injection moulding. For example, in certain embodiments, the filled polymer has a MFI @ 2.16 kg/190° C. of equal to or less than about 1.0 g/10 mins and an apparent MFI during injection moulding of at least about 4 g/10 mins @ 2.16 kg/190° C., for example, an apparent MFI during injection moulding of at least about 5 g/10 mins @ 2.16 kg/190° C. In certain embodiments, the filled polymer has a MFI @ 2.16 kg/190° C. of equal to or less than about 0.5 g/10 mins, and an apparent MFI during injection moulding of at least about 4 g/10 mins @ 2.16 kg/190° C., for example, an apparent MFI during injection moulding of at least about 5 g/10 mins @ 2.16 kg/190° C. By "apparent MFI" is meant that the filled polymer resin has a processability by injection moulding which is indicative of a MFI which is higher than the MFI determined @ 2.16 kg/190° C. In accordance with ISO 1133 (e.g., ISO 1133-1:2011), e.g., a filled polymer resin having a MFI of 0.5 g/10 mins @ 2.16 kg/190° C. processes as if its MFI is at least about 3.5 g/10 mins @ 2.16 kg/190° C., or at least about 4.0 g/10 mins @ 2.16 kg/190° C., or at least about 4.5 g/10 mins @ 2.16 kg/190° C., or at least about 5.0 g/10 mins @ 2.16 kg/190° C., or at least about 5.0 g/10 mins @ 2.16 kg/190° C. In certain embodiments, the apparent MFI is no more than about 8.0 g/10 @ 2.16 kg/190° C. higher, for example, no more than about 7.5 g/10 @ 2.16 kg/190° C. higher, or no more than about 7.0 g/10 @ 2.16 kg/190° C. higher.

In certain embodiments, the filled polymer resin, for example, a filled polymer resin having an MFI of less than about 0.5 g/10 mins @ 2.16 kg/190° C. processes (by injection moulding) similarly to an unfilled HDPE virgin resin having an MFI of from about 5-6 g/10 mine @ 2.16 kg/190° C.

Additionally or alternatively, the filled polymer resin may be characterized in terms of Spiral Flow Number (SFN). The spiral flow test provides a measure of the processability of polymer resin under the more "real life" shear rates seen in the injection moulding process. The SFN is a measure of the length of flow for the tested resin. SFN is determined by injection moulding the polymer resin under the following conditions (using a Spiral Flow Mould and Engel 55t Servo Electric/E-motion injection moulding machine):

Melt temperature: 220° C.;
Back pressure: 90 bar
Screw Surface Speed: 550 mm/s
Injection time: 1 s or 2 s
Injection Speed: 30 mm/s or 15 mm/s
Mould temperature: 25° C.

The spiral flow test is conducted using a spiral mould of appropriate dimensions. Nominal dimensions of the spiral flow mould, sometimes referred to as spiral cavity channel, may be from 500 mm-1500 mm in length (e.g., from 700-1000 mm), from 4 to 8 mm in width (e.g., about 6.35 mm) and from about 0.8 to about 3 mm in depth (e.g., about 1.57 mm).

In certain embodiments, the SFN of the filled polymer resin is at least about 350 mm, for example, at least about 375 mm, or at least about 400 mm, or at least about 410 mm, or at least about 420 mm, or at least about 430 mm, or at least about 440 mm, or at least about 450 mm. In certain embodiments, the SFN is from about 350 mm to about 500 mm, for example, from about 375 mm to about 475 mm, or from about 400 mm to about 475 mm, or from about 425 mm to about 475 mm, or from about 440 mm to about 460 mm. In such embodiments, the injection time may be 2 s and the injection speed 15 mm/s. In such embodiments, the peak pressure average during injection moulding may be from about 1500 to 2000 bar, for example, from about 1750 to 2000 bar, or from about 1800 to about 1950 bar, or from about 1850 to about 1950 bar, or any other peak pressure average or range of peak pressure average described herein. In such embodiments, the melt temperature may be from about 190° C. to 250° C., for example, from about 200° C. to about 240° C., or any other melt temperature or range melt temperatures described herein.

In certain embodiments, the filler polymer resin has a spiral flow number (SFN) which is greater than the SFN of a comparable unfilled virgin HDPE polymer resin having an equivalent MFI @ 2.16 kg/190° C.

In certain embodiments, the filler polymer resin has a SFN which is at least 80% of the SFN of an unfilled HDPE virgin polymer resin having a MFI of 8 g/10 mins @ 2.16 kg/190° C., for example, at least about 85% of the SFN of an unfilled HDPE virgin polymer resin having a MFI of 8 g/10 mins @ 2.16 kg/190° C., or at least about 90% of the SFN of an unfilled HDPE virgin polymer resin having a MFI of 8 g/10 mins @ 2.16 kg/190° C.

In certain embodiments, the filled polymer resin has a MFI @ 2.16 kg/190° C. of less than about 2.5 g/10 mins @ 2.16 kg/190° C., for ex example, less than about 2.0 g/10 min and (a) a SFN which is comparable to an unfilled virgin HDPE resin having a MFI 15 @ 2.16 kg/190° C. of at least about 5.0 g/10 min, and/or (b) a SFN which is at least 80% of the SFN of an unfilled virgin HDPE polymer resin having a MFI of 8 g/10 mins @2.16 kg/190° C., for example, at least about 85% of the SFN of an unfilled HDPE virgin polymer resin having a MFI of 8 g/10 mins @ 2.16 kg/190° C., or at least about 90% of the SFN of an unfilled HDPE virgin polymer resin having a MFI of 8 g/10 mins @ 2.16 kg/190° C.

In certain embodiments, the filled polymer resin has a MFI @ 2.16 kg/190° C. of less than about 2.5 g/10 mins @ 2.16 kg/190° C. for example, less than about 2.0 g/10 min and a SFN which is comparable to an unfilled virgin HDPE resin having a MFI @ 2.16 kg/190° C. of at least about 5.0 g/10 min.

In certain embodiments, the filled polymer resin has a MFI @ 2.16 kg/190° C. of less than about 2.5 g/10 mins @ 2.16 kg/190° C., for example, less than about 2.0 g/10 min and a SFN which is at least 80% of the SFN of an unfilled virgin HDPE polymer resin having a MFI of 8 g/10 mins @ 2.16 kg/190° C., for example, at least about 85% of the SFN of an unfilled HDPE virgin polymer resin having a MFI of 8 g/10 mins @ 2.16 kg/190° C., or at least about 90% of the SFN of an unfilled HDPE virgin polymer resin having a MFI of 8 g/10 mins @ 2.16 kg/190° C.

In certain embodiments, the filled polymer resin has a MFI @2.16 kg/190° C. of less than about 2.5 g/10 mins @ 2.16 kg/190° C., for examples, less than about 2.0 g/10 min, a SFN which is comparable to an unfilled virgin HDPE resin having a MFI @ 2.16 kg/190° C. of at least about 5.0 g/10 min, and a SFN which is at least 80% of the SFN of an unfilled virgin HDPE polymer resin having a MFI of 8 g/10 mine @ 2.16 kg/190° C., for example, at least about 85% of the SFN of an unfilled HDPE virgin polymer resin having a MFI of 8 g/10 mins @ 2.16 kg/190° C., or at least about 90% of the SFN of an unfilled HDPE virgin polymer resin having a MFI of 8 g/10 mins @ 2.16 kg/190° C.

In certain embodiments, the filled polymer resin is characterised in terms of a ratio of its MFI @ 21/6 kg/190° C. to its MFI @ 2.16 kg/190° C., referred to herein after as R-MFI. This is indicative of the distribution of molar mass in a given polymer sample. The larger the R-MFI, the broader the molecular weight distribution. For example, a monodisperse polymer where all the chain lengths are equal has a R-MFI of 1. As noted, the R-MFI is calculated as the ratio of the MFI @ 21/6 kg/190° C. to the MFI @2.16 kg/190° C., i.e., $$R\text{-MFI}=(\text{MFI @21.6 kg})/(\text{MFI @2.16 kg}) \quad (1)$$

Additionally or alternatively, the filled polymer resin may be characterised in terms of the difference between the MFI @ 21.6 kg/190° C. and the MFI @ 2.16 kg/190° C., i.e., $$\Delta\text{MFI}=(\text{MFI @21.6 kg/190° C.})-(\text{MFI @2.16/190° C. kg}) \quad (2)$$

In certain embodiments, the filled polymer resin has a R-MFI of at least about 100 and/or a ΔMFI of at least about 40.0. In such embodiments, the filled polymer resin may have a MFI @ 2.16 kg/190° C. of less than about 1.5 g/10 mins, or less than about 1.0 g/10 mins, or less than about 0.75 g/10 mins, or less than about 0.50 g/10 mins, or less than about 0.35 g/10 mins, or less than about 0.20 g/10 mins.

In certain embodiments, the R-MFI is at least about 125, for example, from about 150 to about 500, or from about 150 to about 450, or from about 150 to about 400, or from about 150 to about 350, or from about 200 to about 350, or from about 250 to about 350, or from about 300 to about 350. Additionally or alternatively, ΔMFI is at least about 41.0, or at least about 42.0, or at least about 43.0, or at least about 44.0, or at least about 45.0, or at least about 46.0, or at least about 47.0, or at least about 48.0, or at least about 49.0, or at least about 50.0, or at least about 51.0, or at least about 52.0, or at least about 53.0, or at least about 54.0, or at least about 55.0, or at least about 56.0, or at least about 57.0. In certain embodiments, ΔMFI is no greater than about 70, for example, no greater than about 65.0, or no greater than about 60.0. In such embodiments, the filled polymer resin may have a MFI @ 2.16 kg/190° C. of less than about 1.5 g/10 mins, or less than about 1.0 g/10 mins, or less than about 0.75 g/10 mins, or less than about 0.50 g/10 mins, or less than about 0.35 g/10 mins, or less than about 0.20 g/10 mins.

In certain embodiments, the filled polymer resin has a broader molecular weight distribution than an unfilled virgin HDPE polymer resin. As such, at a given MFI @2.16 kg/190° C., the filled polymer resin may have a higher R-MFI than an unfilled virgin HDPE polymer resin.

In certain embodiments, the viscosity of the filled polymer resin decreases more rapidly at higher shear rate compared to an unfilled virgin HDPE polymer resin. As such, at a given MFI @ 2.16 kg/190° C., the viscosity of the filled polymer resin will decrease more rapidly when subjected to an ever increasing shear rate compared to the viscosity decrease of an unfilled virgin HDPE resin subjected to the same increasing shear rate.

In certain embodiments, the filled polymer resin comprises at least about 50% by weight recycled polymer (based on the total weight of polymer in the filled polymer resin), for example, at least about 60% by weight, or at least about 70% by weight, or at about 80% by weight, or at least about 95% by weight, or at least about 99% by weight recycled polymer. In certain embodiments, recycled polymer constitutes substantially all, I.e., about 100% by weight, of the polymer of the filled polymer resin.

In certain embodiments, the filled polymer resin comprises no more than about 20% by weight of virgin polymer (based on the total weight of polymer in the filled polymer resin), for example, no more than about 15% by weight of virgin polymer, or no more than about 10% by weight of virgin polymer, or no more than about 5% by weight of virgin polymer, or no more than about 2% by weight of virgin polymer, or no more than about 1% by weight of virgin polymer, or no more than about 0.5% by weight of virgin polymer, or no more than about 0.1% by weight of virgin polymer.

In certain embodiments, the filled polymer resin is free of virgin polymer.

In certain embodiments, the filled polymer resin comprise a mixture of polymer types, for example, a mixture of polyethylene and polypropylene, or a mixture of different types of polyethylene, e.g., HDPE, LDPE and/or LLDPE, or a mixture of different types of polyethylene and polypropylene. In certain embodiments, the filled polymer resin comprises a mixture of polymer types which individually have a MFI of greater than or less than about 2.0 g/10 mins @ 2.16 kg/190° C.) provided the filled polymer resin as a whole has a MFI of less than 2.5 g/10 mins @ 2.16 kg/190° C., for example, less than 2.0 g/10 mins @ 2.16 kg/190° C., or less than about 1.5 g/10 mins @ 2.16 kg/190° C., or less than about 1.0 g/mins @ 2.16 kg/190° C., or less than about 0.5 g/10 mins @ 2.16 kg/190° C. In certain embodiments, at least 75% by weight of the filled polymer resin is a mixture of polyethylene and polypropylene, for example, a mixture of HDPE and polypropylene (based on the total weight of polymer in the filled polymer resin), for example, from 75% to about 99% of a mixture of polyethylene and polypropylene, for example, a mixture of HDPE and polypropylene. In such embodiments, HDPE may constitute from about 50% to about 95% by weight of the filled polymer resin (based on the total weight of the polymer of the filled polymer resin), for example, from about 60% to about 90% by weight, or from about 70% to about 90% by weight, of from about 70% to about 85% by weight, or from about 70% to about 80% by weight, or from about 75% to about 80% by weight of the filled polymer resin (based on the total weight of the polymer of the filled polymer resin).

In certain embodiments, the HDPE is mixture of HDPE from different sources, for example, from different types of post-consumer polymer waste, e.g., recycled blow-moulded HDPE and/or recycled injection moulded HDPE.

Generally, HDPE is understood to be a polyethylene polymer mainly of linear, or unbranched, chains with relatively high crystallinity and melting point, and a density of about 0.96 g/cm$^3$ or more. Generally, LDPE (low density polyethylene) is understood to be a highly branched polyethylene with relatively low crystallinity and melting point, and a density of from about 0.91 g/cm$^3$ to about 0.94 g/cm. Generally, LLDPE (linear low density polyethylene) is understood to be a polyethylene with significant numbers of short branches, commonly made by copolymerization of ethylene with longer-chain olefins. LLDPE differs structurally from conventional LDPE because of the absence of long chain branching.

In certain embodiments, the filled polymer resin comprises up to about 20% by weight of polymers other than HDPE such as, for example, LDPE, LLDPE and polypropylene, any or all of which may be recycled from polymer waste, e.g., post-consumer polymer waste. In certain embodiments, the recycled polymer comprises up to about 20% by weight polypropylene, based on the total weight of the recycled polymer, for example, from about 1% to about 20% by weight, or from about 5% to about 18% by weight, or from about 10% to about 15% by weight, or from about 12 to about 14% by weight polypropylene.

In certain embodiments, the polymer component of the filled polymer resin, other than any impact modifier which may be present, is a mixture of polyethylene and polypropylene, for example, a mixture of recycled polyethylene and polypropylene, for example, polyethylene and polypropylene derived from a recycled mixed polyolefin feedstock consisting of polyethylene and polypropylene. In such embodiments, the filled polymer resin may comprise up to about 30% by weight of recycled polypropylene, based on the total weight of the filled polymer resin, for example, up to about 25% by weight polypropylene, or up to about 20% by weight polypropylene, or up to about 15% by weight polypropylene, or up to about 12.5% by weight polypropylene, or up to about 10% by weight polypropylene, or up to about 7.5% by weight polypropylene, or up to about 5% by weight polypropylene. In certain embodiments, the filled polymer resin comprises at least about 4% by weight polypropylene, for example, at least about 6% by weight polypropylene, or at least about 8% by weight polypropylene, or at least about 10% by weight polypropylene, or at least about 12% by weight polypropylene, based on the total weight of the filled polymer resin. In such embodiments, the polyethylene may be HDPE.

In certain embodiments, filled polymer resin has a density of greater than about 1.00 to equal to or less than about 1.05 g/cm$^3$. Density may be determined in accordance with ISO1183.

In certain embodiments, the functional filler comprises an inorganic particulate having a $d_{50}$ of no greater than about 2.5 μm and/or a surface treatment agent on the surface of the inorganic particulate. In certain embodiments, the inorganic particulate has a $d_{50}$ of from about 0.1 μm to about 2.0 μm, for example, from about 0.1 μm to about 1.5 μm, or from about 0.1 μm to about 1.0 μm, or from about 0.2 to about 0.9 μm, or from about 0.2 μm to about 0.7 μm, or from about 0.3 μm to about 0.7 μm, or from about 0.4 to about 0.6 μm, or from about 0.5 to about 0.6 μm. The particle sizes described herein pertain to the inorganic particulate absent any surface treatment agent.

Unless otherwise stated, particle size properties referred to herein for the inorganic particulate materials are as measured by the well known conventional method employed in the art of laser light scattering, using a CILAS 1064 instrument (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

In certain embodiments, the inorganic particulate does not have a surface treatment on its surface.

In certain embodiments, the inorganic particulate is treated with a surface treatment agent, i.e., a coupling modifier, such that the inorganic particulate has a surface treatment on its surface. In certain embodiments, the inorganic particulate is coated with the surface treatment agent.

The purpose of the surface treatment agent is to improve the compatibility of the inorganic particulate and the polymer matrix with which it is to be combined, and/or improve the compatibility of different polymers in the recycled polymer. In recycled polymer resins the surface treatment may serve to cross-link or graft the different polymers. In certain embodiments, the surface treatment agent serves as a coupling modifier, wherein coupling involves a physical (e.g., steric) and/or chemical (e.g., chemical bonding, such as covalent or van der Waals) interaction between the polymers and/or between the polymers and the surface treatment agent.

In other aspects and embodiments of the present invention, the coating additionally or alternatively comprises a compound selected from the group consisting of one or more fatty acids and one or more salts of fatty acids, for example, stearic acid or calcium stearate.

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

A preferred inorganic particulate material is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art.

The surface treatment agent, when present, may comprise an O- or N-containing acid functionality, for example, a compound including a hydrocarbyl unsaturation and an O- and/or N-containing acid functionality. In certain embodiments, the hydrocarbyl unsaturation is one or more ethylenic groups, at least one of which may be a terminal group. The acid functionality may comprise a carboxylic acid, carboxy, carbonyl and or ester functionality.

In certain embodiments, the surface treatment agent comprises a compound having a saturated hydrocarbyl group and an O- or N-containing acid functionality, for example, a carboxylic acid, carboxy, carbonyl and or ester functionality.

In certain embodiments, the surface treatment comprises both a compound including a hydrocarbyl unsaturation and an O- and/or N-containing acid functionality, and compound having a saturated hydrocarbyl group and an O- or N-containing acid functionality.

In certain embodiments, the functional filler and, hence, the filled polymer resin does not comprise both of a compound including a hydrocarbyl unsaturation and an O- and/or N-containing acid functionality, and a compound having a saturated hydrocarbyl group and an O- or N-containing acid functionality.

In certain embodiments, the surface treatment agent does not comprise a compound selected from the group consisting of one or more fatty acids and one or more salts of a fatty acid.

In certain embodiments, the compound having a saturated hydrocarbyl group and an O- or N-containing acid functionality is a saturated fatty acid, or a metal salt thereof, or a mixture of such fatty acids and/or salts. In certain embodiments, surface treatment agent comprise stearic acid, optionally in combination with other fatty acids.

In certain embodiments, the compound including a hydrocarbyl unsaturation and an O- and/or N-containing acid functionality is a carboxylic acid or carboxylate, for example, a propanoic group, or an acrylic acid or acrylates, or an imide. Specific examples of coupling modifiers are β-carboxy ethylacrylate, β-carboxyhexylmaleimide, 10-carboxydecylmaleimide and 5-carboxy pentyl maleimide.

In certain embodiments, the compound including a hydrocarbyl unsaturation and an O- and/or N-containing acid functionality is an unsaturated fatty acid, or a metal salt thereof, or a mixture of such fatty acids and/or salts.

In certain embodiments, the surface treatment agent comprises one or more of a $C_1$-$C_{18}$, $C_2$-$C_{18}$ and $C_{2-5}$ alkylene group. In certain embodiments, said group or groups bridges between a hydrocarbyl unsaturation, for example, a terminal ethylenic group and an O- and/or N-containing acid functionality. In such embodiments, the O- and/or N-containing acid functionality may be a carboxylic acid or carboxylate, for example, a propanoic group, or an acrylic acid or acrylates, or an imide.

The functional filler may be present in the filled polymer resin in an amount ranging from about 1% up to about 70% by weight, based on the total weight of the filled polymer resin. For example, from about 2% to about 60% by weight, or from about 3% to about 50% by weight, or from about 4% to about 40% by weight, or from about 5% to about 30% by weight, or from about 6% to about 25% by weight, or from about 7% to about 20% by weight, or from about 8% to about 15% by weight, or from about 8% to about 12% by weight, based on the total weight of the filled polymer resin. The functional filler may be present in amount less than or equal to about 80% by weight of the filled polymer resin, for example, less than or equal to about 70% by weight, or less than or equal to about 60% by weight, or less than or equal to about 50% by weight, or less than or equal to about 40% by weight, or less than or equal to about 30% by weight, or less than or equal to about 20% by weight, or less than or equal to about 50% by weight, based on the total weight of the filled polymer resin.

The surface treatment agent (i.e., coupling modifier) of the functional filler may be present in an amount of from about 0.01% by weight to about 4% by weight, based on the total weight of the filled polymer resin, for example, from about 0.02% by weight to about 3.5% by weight, or from about 0.05% by weight to about 1.4% by weight, or from about 0.1% by weight to about 0.7% by weight, or from about 0.15% by weight to about 0.7% by weight, or from about 0.3% by weight to about 0.7% by weight, or from about 0.5% by weight to about 0.7% by weight, or from about 0.02% by weight to about 0.5%, or from about 0.05% by weight to about 0.5% by weight, or from about 0.1% by weight to about 0.5% by weight, or from about 0.15% by weight to about 0.5% by weight, or from about 0.2% by weight to about 0.5% by weight, or from about 0.3% by weight to about 0.5% by weight, based on the total weight of the filled polymer resin.

Additionally or alternatively, the surface treatment agent may be present in an amount equal to or less than about 5 wt. % based on the total weight of the functional filler, for example equal to or less than about 2 wt. % or, for example equal to or less than about 1.5 wt. %. In an embodiment, the surface treatment agent is present in the functional filler in an amount equal to or less than about 1.2 wt. % based on the total weight of the functional filler, for example equal to or less than about 1.1 wt. %, for example equal to or less than about 1.0 wt. %, for example, equal to or less than about 0.9 wt. %, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example less than about 0.1 wt. %. Typically, the surface treatment agent is present in the functional filler in an amount greater than about 0.05 wt. %. In further embodiments, the surface treatment agent is present in the functional filler in an amount ranging from about 0.1 to 2 wt. % or, for example, from about 0.2 to about 1.8 wt. %, or from about 0.3 to about 1.6 wt. %, or from about 0.4 to about 1.4 wt. %, or from about 0.5 to about 1.3 wt. %, or from about 0.6 to about 1.2 wt. %, or from about 0.7 to about 1.2 wt. %, or from about 0.8 to about 1.2 wt. %, or from about 0.8 to about 1.1 wt. %.

The filled polymer resin may additionally comprise a peroxide-containing additive. In an embodiment, the peroxide-containing additive comprises di-cumyl peroxide or 1,1-Di(tert-butylperoxy)-3,3,5-trimethylcyclohexane. The peroxide-containing additive may not necessarily be included with the surface treatment agent and instead may be added during the compounding of the functional filler and the recycled polymers, as described below. In some polymer systems, e.g., those containing HDPE, the inclusion of a peroxide-containing additive may promote cross-linking of the polymer chains. In other polymer systems, e.g., polypropylene, the inclusion of a peroxide-containing additive may promote polymer chain scission. The peroxide-containing additive may be present in amount effective to achieve the desired result. This will vary between coupling modifiers and may depend upon the precise composition of the inorganic particulate and the polymer. For example, the peroxide-containing additive may be present in an amount equal to or less than about 1 wt. % based on the weight of the filled polymer resin to which the peroxide-containing additive is to be added, for example, equal to or less than about 0.5 wt. %, for example, 0.1 wt %, for example equal to or less than about 0.09 wt. %, or for example equal to or less than about 0.08 wt. % or for example, equal to or less than about 0.06 wt. %. Typically, the peroxide-containing additive, if present, is present in an amount greater than about 0.01 wt. % based on the weight of the filled polymer resin. In certain embodiments, the filled polymer resin comprises from about 0.01 wt. % to about 0.05 wt. % of a peroxide-containing additive, for example, di-cumyl peroxide or 1,1-Di(tert-butylperoxy)-3,3,5-trimethylcyclohexane, for example, from about 0.01 wt. % to about 0.05 wt. %, or from about 0.01 wt. % to about 0.03 wt. %, or from about 0.0125 wt. % to about 0.0275 wt. %, or from about 0.015 wt. % to about 0.025 wt. %, or from about 0.0175 wt. % to about 0.0225 wt. %, or from about 0.018 wt. % to about 0.022 wt. %, or from about 0.019 wt. % to about 0.021 wt. %, or about 0.02 wt. %. In such embodiments, the filled polymer resin may have a MFI of less than about 2.5 g/10 mins @ 2.16 kg/190° C., for example, from about 1.0 g/10 mins @ 2.16 kg/190° C. to about 2.5 g/10 mins @ 2.16 kg/190° C., for example, equal to or less than about 1.5 g/10 mins@ 2.16 kg/190° C., or equal to or less than about 1.0 g/10 mins@ 2.16 kg/190° C., or equal to or less than about 0.5 g/10 mins @ 2.16 kg/190° C.

In certain embodiments, the filled polymer resin comprises from about 0.015 wt. % to about 0.025 wt. % of the peroxide-containing additive, for example, di-cumyl peroxide.

In such embodiments, inclusion of a relatively minor amount of peroxide-containing additive may serve to modify, for example, enhance, one or more mechanical properties of injected moulded parts formed from the filled polymer resin, for example, filled polymer resin comprising recycled polyethylene and up to about 20 wt. % of optionally recycled polypropylene, based on the total weight of the filled polymer resin, for example, from about 2-15 wt. % of optionally recycled polypropylene, or from about 3-15 wt. %, or 4-14 wt. %, or 2-10 wt. %, or 3-9 wt. %, or 4-8 wt. %, or 7-15 wt. %, or 8-15 wt. % of optionally recycled polypropylene. In certain embodiments, all of the polypropylene is recycled polypropylene, which may be derived from a recycled mixed polyolefin feedstock comprising polyethylene and polypropylene. Without wishing to be bound by theory, it is believed that a balance of enhanced mechanical properties is obtainable by optimizing the level of peroxide-containing additive in relation to the relative amounts of polyethylene, polypropylene and functional filler. This also demonstrates the ability of the functional filler to decrease the interfacial tension between normally immiscible polymer types, e.g., polyethylene and polypropylene, and enhancing mechanical properties.

Mechanical properties include one or more of elongation at break, flexural modulus, ultimate tensile stress (UTS) and Charpy (unnotched) Impact Strength. Tensile properties, e.g., elongation at break and UTS, may be determined in accordance with ISO527-2, at room temperature, using a Tinius Olsen Benchtop tensile tester, and based on average of eight measurements for each test piece. Charpy Impact Strength may be determined at −20° C.±2° C. in accordance with ISO179-2 using an Instron Ceast 9340 falling-weight impact tester. Flexural modulus may be determined in accordance with ISO 178.

In certain embodiments, the injected moulded part has an elongation at break of at least about 15%, for example, at least about 25%, or at least about 50%, or at least about 75%, or at least about 100%, or at least about 150%, or at least about 200%, or at least about 250%, or at least about 300%, or at least about 325%, or at least about 340%. In certain embodiments, the elongation at break is no greater than about 500%, or no greater than about 450%, or no greater than about 400%.

In certain embodiments, the injected moulded part has a UTS of from about 15-30 MPa, for example, from about 20-30 MPa, or from about 20-25 MPa, or from about 20-23 MPa, or from about 20-22 MPa, or from about 20-21 MPa.

In certain embodiments, the injected moulded part has a flexural modulus of at least about 750 MPa, for example, at least about 800 MPa, or at least about 850 MPa, or at least about 900 MPa, or from about 900-1250 MPa, or from about 900-1200 MPa, or from about 900-1150 MPa, or from about 900-1100 MPa, or from about 900-1050 MPa, or from about 900-1000 MPa, or from about 925-975 MPa.

In certain embodiments, an injected moulded part form from the filled polymer resin has one or more of:
(a) an elongation at break of at least about 300%, for example, when the injected moulded part is formed from a filled polymer resin comprising at least 8 wt. % polypropylene, and optionally no more than about 12 wt. % functional filler;
(b) a UTS of at least about 20 MPa, for example, from about 20-22 MPa;
(c) a flexural modulus of at least about 900 MPa; and
(d) a Charpy Impact Strength of at least about 40 kJ/m$^2$ (20° C.±2° C.), for example, at least about 80 kJ/m$^2$ (−20° C.±2° C.).

In certain embodiments, for example, embodiments having one or more of (a), (b), (c) and (d) above, the injected moulded part is formed from a filled polymer resin comprising:
from about 0.015 wt. % to about 0.025 wt. % of the peroxide-containing additive, for example, dicumyl peroxide,
a polypropylene content of at least about 8 wt. %, for example, from about 8-15 wt. %,
the balance of the polymer component being polyethylene, optionally wherein the polypropylene and polyethylene are derived from the same recycled mixed polyolefin source,
from about 8-12 wt. % functional filler,
an MFI of less than 2.5 g/10 mins @ 2.16 kg/190° C., for example, from about 2.0-2.45 g/10 mins @ 2.16 kg/190° C.
and optionally up to about 2 wt. % carbon black and up to about 0.5 wt. % antioxidant;
and having:
an elongation at break of at least about 300%,
and optionally:
a UTS of from about 20-25 MPa, and/or
a flexural modulus of at least about 900 MPa, for example, from about 920-1250 MPa, or from about 920-980 MPa, and/or
a Charpy Impact Strength of at least about 80 kJ/m$^2$ (−20° C.±2° C.), for example, from about 80-90 kJ/m$^2$ (−20° C.±2° C.).

In such embodiments, the functional filler may be ground calcium carbonate having a $d_{50}$ of from about 0.5-1.5 μm, for example, from about 0.5-1.0 μm, or from about 0.6-1.0 μm, or from about 0.7-0.9 μm, or about 0.8 μm, which is surface treated with a compound according to formula (1).

The functional filler may be prepared by combining the inorganic particulate, surface treatment agent and optional peroxide-containing additive and mixing using conventional methods, for example, using a Steele and Cowlishaw high intensity mixer, preferably at a temperature equal to or less than 80° C. The compound(s) of the surface treatment agent may be applied after grinding the inorganic particulate, but before the inorganic particulate is added to the optionally recycled polymer composition. For example, the surface treatment agent may be added to the inorganic particulate in a step in which the inorganic particulate is mechanically de-aggregated. The surface treatment agent may be applied during de-aggregation carried out in a milling machine.

The functional filler may additionally comprise an antioxidant. Suitable antioxidants include, but are not limited to, organic molecules consisting of hindered phenol and amine derivatives, organic molecules consisting of phosphates and lower molecular weight hindered phenols, and thioesters. Exemplary antioxidants include Irganox 1010 and Irganox 215, and blends of Irganox 1010 and Irganox 215. The amount of antioxidant may range from about 0.01% by weight to about 5% by weight, based on polymer content, for example, from about 0.05% by weight to about 2.5% by weight, or from about 0.05% by weight to about 1.5% by weight, or from about 0.05% by weight to about 1.0% by weight, or from about 0.05% by weight to about 0.5% by weight, or from about 0.05% by weight to about 0.25% by weight, or from about 0.05% by weight to about 0.15% by weight based on polymer content.

In certain embodiments, the filled polymer resin composition comprises (for example, up to about 5 wt. %, based on the total weight of the filled polymer resin) a secondary filler component other than the functional filler. The secondary filler may be in certain embodiments an uncoated inorganic particulate material, such as for example, the inorganic particulate materials described herein. In certain embodiments, the secondary filler is carbon black, for example, from about 0.1-5.0 wt. % carbon black, or from about 0.5-4.0 wt. %, or from about 0.5-1.5 wt. %, or from about 1.0-3.0 wt. %, or from about 1.5-2.5 wt. %, or about 2.0 wt. %, or about 1.0 wt. %, based on the total weight of the filled polymer resin. The aforementioned amounts may also apply to secondary filler other than carbon black.

In certain embodiments, the filled polymer resin comprises an impact modifier, for example, up to about 20% by weight of an impact modifier, based on the total weight of the filled polymer resin, for example, from about 0.1% by weight to about 20% by weight, or from about 0.5% by weight to about 15% by weight, or from about 1% by weight to about 12.5% by weight, or from about 2% by weight to about 12. % % by weight, or from about 1% by weight to about 10% by weight, or from about 1% by weight to about 8% by weight, or from about 1% by weight to about 6% by weight, or from about 1% by weight to about 4% by weight of an impact modifier, based on the total weight of the filled polymer resin.

In certain embodiments, the impact modifier is an elastomer, for example, a polyolefin elastomer. In certain embodiments, the polyolefin elastomer is a copolymer of ethylene and another olefin (e.g., an alpha-olefin), for example, octane, and/or or butene and/or styrene. In certain embodiments, the impact modifier is a copolymer of ethylene and octene. In certain embodiments, the impact modifier is a copolymer of ethylene and butene.

In certain embodiments, the impact modifier, for example, polyolefin copolymer as described above, such as an ethylene-octene copolymer, has a density of from about 0.80 to about 0.95 g/cm$^3$ and/or a MFI of from about 0.2 g/10 min (2.16 kg@190° C.) to about 30 g/10 min (2.16 kg@190° C.), for example, from about 0.5 g/10 min (2.16 kg@190° C.) to about 20 g/10 min (2.16 kg@190° C.), or from about 0.5 g/10 min (2.16 kg@190° C.) to about 15 g/10 min (2.16 kg@190° C.), or from about 0.5 g/10 min (2.16 kg@190° C.) to about 10 g/10 min (2.16 kg@190° C.), or from about 0.5 g/10 min (2.16 kg@190° C.) to about 7.5 g/10 min (2.16 kg@190° C.), or from about 0.5 g/10 min (2.16 kg@190° C.) to about 5 g/10 min (2.16 kg@190° C.), or from about 0.5 g/10 min (2.16 kg@190° C.) to about 4 g/10 min (2.16 kg@190° C.), or from about 0.5 g/10 min (2.16 kg@190° C.) to about 3 g/10 min (2.16 kg@190° C.), or from about 0.5 g/10 min (2.16 kg@190° C.) to about 2.5 g/10 min (2.16 kg@190° C.), or from about 0.5 g/10 min (2.16 kg@190° C.) to about 2 g/10 min (2.16 kg@190° C.), or from about 0.5 g/10 min (2.16 kg@190° C.) to about 1.5 g/10 min (2.16 kg@190° C.). In such or certain embodiments, the impact modifier is an ethylene-octene copolymer having a density of from about 0.85 to about 0.86 g/cm$^3$. Exemplary impact modifiers are polyolefin elastomers made by DOW under the Engage® brand, for example, Engage® 8842. In such embodiments, the compounded polymer resin may additionally comprise an antioxidant, as described herein.

In certain embodiments, the impact modifier is a copolymer based on styrene and butadiene, for example, a linear block copolymer based on styrene and butadiene. In such embodiments, the impact modifier may have a MFI of from about from about 1 to about 5 g/10 min (200° C. @ 5.0 kg), for example, from about 2 g/10 min (200° C. @ 5.0 kg) to about 4 g/10 min (200° C. @5.0 kg), or from about 3 g/10 min (200° C. @5.0 kg) to about 4 g/10 min (200° C. @ 5.0 kg).

In certain embodiments, the impact modifier is a triblock copolymer based on styrene and ethylene/butene. In such embodiments, the impact modifier may have a MFR of from about 15 g/10 min (200° C. @ 5.0 kg) to about 25 g/10 min (200° C. @5.0 kg), for example, from about 20 g/10 min (200° C. @ 5.0 kg) to about 25 g/10 min (200° C. @5.0 kg).

The articles of manufacture that are obtained by injection moulding a filled polymer resin as described herein are many and various.

In certain embodiments, the article of manufacture is the form of one of the following: panels (e.g., automotive panels), pallets, pipes, doors, shutters, awnings, shades, signs, frames, window casings, mobile phone casings, pails, backboards, wallboards, flooring, tiles, railroad ties, forms, trays, tool handles, stalls, bedding, dispensers, staves, totes, barrels, boxes, packing materials, baskets, racks, casings, binders, dividers, walls, mats, frames, bookcases, sculptures, chairs, tables, desks, art, toys, games, wharves, piers, boats, masts, septic tanks, substrates, computer housings, above- and below-ground electrical casings, PCB covers, furniture, picnic tables, tents, playgrounds, benches, shelters, sporting goods, bedpans, plaques, trays, hangers, servers, pools, insulation, caskets, bookcovers, canes, crutches, luggage buckle and dips, pump parts, and the like.

In certain embodiments, the article of manufacture, or a part thereof, comprises a wall having a thickness of no more than about 5.0 mm, for example, no more than about 4.0 mm, or no more than 3.0 mm, or no more than about 2.0 mm, or no more than about 1.5 mm, or no more than about 1 mm. In certain embodiments, the article of manufacture, or a part thereof, has a wall thickness of from about 1.0 mm to about 3.0 mm, for example, from about 1.5 mm to about 3.0 mm. It is surprising that such relatively thin-walled parts may be injected moulding from recycled polymer resins.

EXAMPLES

Example 1—Preparation of Polymer Resins

Filled polymer resins were prepared by compounding. These were as follows:

Sample A—recycled HDPE+15 wt. % of an uncoated ground calcium carbonate having a d$_{50}$ of 0.54 μm.

Sample B—a mixture of recycled HDPE and PP+10 wt. % of a surface treated ground calcium carbonate ($d_{50}$=0.8 µm), and having a MFI of 0.29 g/10 mins @ 2.16 kg/190° C.

Sample C—a mixture of recycled HDPE and PP+10 wt. % of a surface treated ground calcium carbonate ($d_{50}$=0.8 µm)+2.5 wt. %% of an ethylene-octene copolymer as impact modifier, and a MFI of 0.15 g/10 mins @ 2.16 kg/190° C.

Sample D—an unfilled virgin HDPE polymer resin having a MFI of 8.0 g/10 mins @2.16 kg/190° C. This is included for comparative purposes.

Example 2—Injection Moulding Process

A mobile phone surround was prepared from each sample by injection moulding using a Sumitomo SE180DU System 180t Servo Electric Injection Moulding Machine (Sumitomo SE180DU C360 with a 32 mm standard engineering screw design).

Conditions:

Melt temperature: 220° C.

Barrel temperature profile: 220-225-225-220-215° C.

Feed throat temperature: 70° C.

Back Pressure: 90 bar

Decompression Distance: 8 mm at 30 mm/s

Screw Surface Speed: 700 mm/s

Injection Speed: 70 mm/s

Dosing Stroke: as required to achieve 100% visual fill with no Holding Stage

Holding Pressure: as required to achieve a flat continuous surface finish

Holding Time: 2.0 seconds

Cooling Time: 6.0 seconds

Clamp Force: 100t

Mould Temperature: 25° C.

Between each sample blend test the injection unit and hot runner system were purged clean with HDPE.

Results are summarised in Tables 1 and 2,

TABLE 1

|  | Injection Time Average | Peak Injection Pressure Average (bar) | Peak Injection Pressure Range (bar) | Cycle Time (seconds) |
| --- | --- | --- | --- | --- |
| Sample A | 0.33 | 1334 | 3.6 | 11.6 |
| Sample B | 0.32 | 1219 | 2.3 | 11.6 |
| Sample C | 0.32 | 1230 | 2.7 | 11.5 |
| Sample D | 0.29 | 997 | 7.0 | 17.6 |

TABLE 2

|  | Average Shot Weight (g) | Weight Range Across 32 Shots (g) |
| --- | --- | --- |
| Sample A | 3.940 | 0.036 |
| Sample B | 3.714 | 0.005 |

TABLE 2-continued

|  | Average Shot Weight (g) | Weight Range Across 32 Shots (g) |
| --- | --- | --- |
| Sample C | 3.713 | 0.007 |
| Sample D | 3.456 | 0.008 |

Example 3—Analysis of Spiral Flow Number (SFN)

The SFN of Samples B, C and D were determined by injection moulding the polymer resin under the following conditions (using a Spiral Flow Mould and Engel 55t Servo Electric/E-motion injection moulding machine):

Melt temperature: 220° C.;

Back pressure: 90 bar

Screw Surface Speed: 550 mm/s

Injection time: 1 s or 2 s

Injection Speed: 30 mm/s or 15 mm/s

Mould temperature: 25° C.

Results are summarized in Tables 3A and 3B.

TABLE 3A

|  | Sample B | | Sample C | |
| --- | --- | --- | --- | --- |
| Injection Time/Speed | 1 second @ 30 mm/s | 2 second @ 15 mm/s | 1 second @ 30 mm/s | 2 second @ 15 mm/s |
| SFN (mm) | 403 | 455 | 416 | 444 |
| Peak Injection Pressure (bar) | 1873 | 1904 | 1834 | 1888 |

TABLE 3B

|  | Sample D | |
| --- | --- | --- |
| Injection Time/Speed | 1 second @ 30 mm/s | 2 second @ 15 mm/s |
| SFN (mm) | 470 | 495 |
| Peak Injection Pressure (bar) | 1335 | 1242 |

Example 4

A series of filled polymer resin were prepared as described in Table 4 below. Recycled mixed polyolefin source A had a MFI of 4.01 g/10 mins @ 2.16 kg/190° C., and recycled polyolefin source B had a MFI of 3.71 g/10 mins @ 2.16 kg/190° C., i.e., that is before compounding with surface treated ground calcium carbonate ($d_{50}$=0.8 µm) functional filler and the other components.

All samples were prepared via melt mixing with a Coperion ZSK twin-screw extruder. The barrel was maintained at 200, 205, 210, 215, 225, 235 and 240° C. from hopper to die. The screw speed was set to 800 rpm, and the feed rate at 8.0 kg/hour. The hot extrudes were immediately quenched in water and pelletized. Test specimens, for mechanical testing, were then produced by injection moulding. Test specimens were prepared using a an Arburg Allrounder 320M, and mouldings were conditioned for a minimum of 40 hours at 23° C. and a relative humidity of 50% prior to the test, in accordance with Procedure A of ASTM D618 (20/23/50).

TABLE 4

| Sample | Recycled mixed polyolefin source A (wt.-%) | Recycled mixed polyolefin source B (wt.-%) | Functional filler (wt.-%) | CB (wt.-%) | A/O (wt.-%) | DCP (wt.-%) | PP Content (wt.-%) |
|---|---|---|---|---|---|---|---|
| 1 | 88.680 | — | 10 | 1.0 | 0.3 | 0.02 | 5.41 |
| 2 | 88.660 | — | 10 | 1.0 | 0.3 | 0.04 | 5.51 |
| 3 | 83.680 | — | 15 | 1.0 | 0.3 | 0.02 | 5.65 |
| 4 | 83.660 | — | 15 | 1.0 | 0.3 | 0.04 | 6.89 |
| 5 | — | 88.680 | 10 | 1.0 | 0.3 | 0.02 | 8.79 |
| 6 | — | 88.660 | 10 | 1.0 | 0.3 | 0.04 | 8.54 |
| 7 | — | 83.680 | 15 | 1.0 | 0.3 | 0.02 | 9.59 |
| 8 | — | 83.660 | 15 | 1.0 | 0.3 | 0.04 | 13.58 |

CB = Carbon black; A/O = antioxidant; DCP = di-cumyl peroxide, PP = Polypropylene Mechanical testing of each test specimen, and the MFI of the compounded resins prior to injection moulding, is summarized in Table 5.

Elongation at break and UTS were carried out at room temperature using a Tinius Olsen Benchtop tensile tester, with results corresponding to an average of eight measurements for each sample, in accordance with ISO572-2.

Flexural modulus was tested in accordance with ISO 178.

Charpy unnotchhed impact tests were carried out at −20° C.±2° C. using a Intron Ceast 9340 falling-weight impact tester, in accordance with ISO179-2. The results provided correspond to an average of complete break measurements for each sample.

TABLE 5

| | Sample | | | | | | | |
|---|---|---|---|---|---|---|---|---|
| | 1 | 2 | 3 | 4 | 5 | 6 | 7 | 8 |
| MFI (g/10 min, 2.16 kg @ 190° C.) | 2.26 | 2.08 | 2.38 | 1.67 | 2.35 | 1.39 | 2.22 | 1.48 |
| UTS (MPa) | 22.5 | 23.0 | 23.0 | 23.1 | 21.4 | 21.7 | 21.5 | 21.9 |
| Break Elongation (%) | 28.1 | 27.6 | 16.4 | 19.9 | 348 | 304 | 121 | 175 |
| Flexural Modulus (MPa) | 1091.1 | 1087.8 | 1202.6 | 994.3 | 948.1 | 947.8 | 1001.8 | 991.2 |
| Charpy impact Strength (KJ/m$^2$, −20° C. ± 2° C.) | 48.9 | 67.1 | 49.5 | 71.5 | 86.2 | 72.9 | 54.4 | 51.4 |

The invention claimed is:

1. An article of manufacture obtained by injection moulding a filled polymer resin comprising a recycled polymer and a functional filler,
   wherein the functional filler comprises an inorganic particulate that (i) is surface treated or (ii) has a $d_{50}$ of less than about 2.5 μm, and
   wherein the filled polymer resin has:
   (1) a MFI at 2.16 kg/190° C. which is lower than then MFI of the filled polymer resin during injection moulding;
   (2) a MFI at 2.16 kg/190° C. which is at least 3 g/10 mins lower than the MFI of the filled polymer resin during injection moulding; or
   (3) a MFI of less than about 2.6 g/10 mins at 2.16 kg/190° C.,
   wherein the inorganic particulate is calcium carbonate; and
   wherein the article has a wall having a thickness of no more than about 5 mm.

2. The article according to claim 1, wherein the filled polymer resin has a MFI of less than about 2.5 g/10 mins at 2.16 kg/190° C.

3. The article according to claim 1, wherein the filled polymer resin has a MFI of less than about 2.5 g/10 mins at 2.16 kg/190° C. and also has (a) a Spiral Flow Number (SFN) which is at least 80% of the SFN of an unfilled virgin HDPE resin having a MFI of at least about 5.0 g/10 min at 2.16 kg/190° C., and/or (b) a SFN which is at least 8% of the SFN of an unfilled virgin HDPE polymer resin having a MFI of 8 g/10 mins at 2.16 kg/190° C.

4. The article according to claim 3, wherein the filled polymer resin has a MFI equal to or less than about 1.0 g/10 mins at 2.16 kg/190° C.

5. The article according to claim 1, wherein the filled polymer resin also has a R-FMI of at least about 100, wherein
   R-MFI=(MFI at 21.6 kg)/(MFI at 2.16 kg), and
   wherein (MFI at 21.6 kg)−(MFI at 2.16 kg) is at least about 40.

6. The article according to claim 1, wherein the filled polymer resin also has a Spiral Flow Number (SFN) of at least about 350 mm.

7. The article according to claim 1, wherein the filled polymer resin comprises at least about 50% by weight recycled polymer.

8. The article according to claim 1, wherein the recycled polymer comprises
   a mixture of polyethylene and polypropylene,
   a mixture of different types of polyethylene,
   a mixture of different types of polyethylene and polypropylene, or
   another mixture of polymer types.

9. The article according to claim 1, wherein the filled polymer resin is free of virgin polymer.

10. The article according to claim 1, wherein the functional filler is an uncoated inorganic particulate having a $d_{50}$ of no greater than about 1.0 μm.

11. The article according to claim 1, wherein the functional filler comprises or is a surface-treated inorganic particulate having a $d_{50}$ of from about 0.1 to 2.5 μm.

12. The article according to claim 1, wherein the inorganic particulate is surface-treated with a surface treatment agent selected from a compound including a hydrocarbyl unsaturation and an O- and/or N-containing acid functionality, and/or a compound having a saturated hydrocarbyl group and an O- or N-containing acid functionality.

13. The article according to claim 1, wherein the filled polymer resin further comprises an impact modifier.

14. The article according to claim 1, wherein the filled polymer resin further comprises from about 0.01 wt. % to about 0.05 wt. % of di-cumyl peroxide or 1,1-Di(tert-butylperoxy)-3,3,5-trimethylcyclohexane or other a peroxide-containing additive, based on the total weight of the filled polymer resin.

15. The article according to claim 14, wherein the filled polymer resin comprises from about 0.015 wt. % to about 0.025 wt. % of the di-cumyl peroxide or 1,1-Di(tert-butylperoxy)-3,3,5-trimethylcyclohexane or other peroxide-containing additive.

16. The article according to claim 1, wherein the filled polymer resin further comprises up to 3 wt. % carbon black and up to about 0.5 wt. % antioxidant, based on the total weight of the filled polymer resin.

17. The article according to claim 1, wherein the recycled polymer of the filled polymer resin, other than impact modifier when present, consists of polyethylene and polypropylene derived from a recycled mixed polyolefin feed.

18. The article according to claim 1, wherein the article has a wall having a thickness of no more than about 3 mm.

19. The article according to claim 1, wherein the article has one or more of:
    (a) an elongation at break of at least about 300%,
    (b) a UTS of at least about 20 MPa,
    (c) a flexural modulus of at least about 90 MPa, and
    (d) a Charpy Impact Strength of at least about 40 KJ/m$^2$ (20° C.±2° C.).

20. The article according to claim 1, wherein the article has an elongation at break of at least about 300%.

21. The article according to claim 1, wherein the article has a UTS of at least about 20 MPa.

22. The article according to claim 1, wherein the article has a flexural modulus of at least about 900 MPa.

23. The article according to claim 1, wherein the article has a Charpy Impact Strength of at least about 40 kJ/m$^2$ (20° C.±2° C.).

* * * * *